United States Patent [19]

Howlett et al.

[11] Patent Number: 4,493,465
[45] Date of Patent: Jan. 15, 1985

[54] HELICOPTER ENGINE TORQUE COMPENSATOR

[75] Inventors: James J. Howlett, North Haven; Raymond D. Zagranski, Somers, both of Conn.

[73] Assignee: Chandler Evans Inc., West Hartford, Conn.

[21] Appl. No.: 369,481

[22] Filed: Apr. 16, 1982

[51] Int. Cl.³ .............................................. B64C 27/78
[52] U.S. Cl. .................................. 244/17.13; 416/27; 416/43; 244/17.21
[58] Field of Search ............... 244/17.13, 17.19, 17.21, 244/17.25, 75 R, 76 R, 76 A; 416/25, 27, 30, 31, 33, 38, 43, 44

[56] References Cited

U.S. PATENT DOCUMENTS

| | | | |
|---|---|---|---|
| 2,645,293 | 7/1953 | Ogle et al. | 416/43 |
| 2,699,833 | 1/1955 | Jensen | 244/17.21 |
| 2,985,243 | 5/1961 | Tyler et al. | 244/76 A |
| 3,174,551 | 3/1965 | McCarthy | 416/38 |
| 3,200,886 | 8/1965 | Magri et al. | 416/43 |
| 3,309,868 | 3/1967 | Downing et al. | 416/27 |
| 3,603,697 | 9/1971 | Lane | 416/33 |
| 3,833,188 | 9/1974 | Robinson | 244/17.19 |
| 4,347,997 | 9/1982 | Byham et al. | 244/17.19 |

FOREIGN PATENT DOCUMENTS

| | | | |
|---|---|---|---|
| 677829 | 1/1964 | Canada | 244/17.13 |
| 772878 | 4/1957 | United Kingdom | 416/38 |

Primary Examiner—Galen L. Barefoot
Attorney, Agent, or Firm—M. P. Williams; Gerald E. Linden

[57] ABSTRACT

The blade angle controlling pitch beam servo (26) of a helicopter tail rotor (22) is responsive to a signal manifestation (76) indicative of free turbine engine (20) gas generator speed (78) to provide torque compensation so that the helicopter airframe will not counter-rotate under the main rotor (10) of a helicopter as a consequence of the torque provided thereto by the airframe-mounted engine (20), or in the absence thereof. A trimming embodiment (FIG. 2) provides only sufficient blade angle command (82a) to compensate for that provided by fixed, collective/tail mixing (110-114). Torque compensation tail rotor blade angle commands may be applied through existing stability and autopilot actuators (30-32) or through an additional torque servo (120, FIG. 3).

2 Claims, 4 Drawing Figures

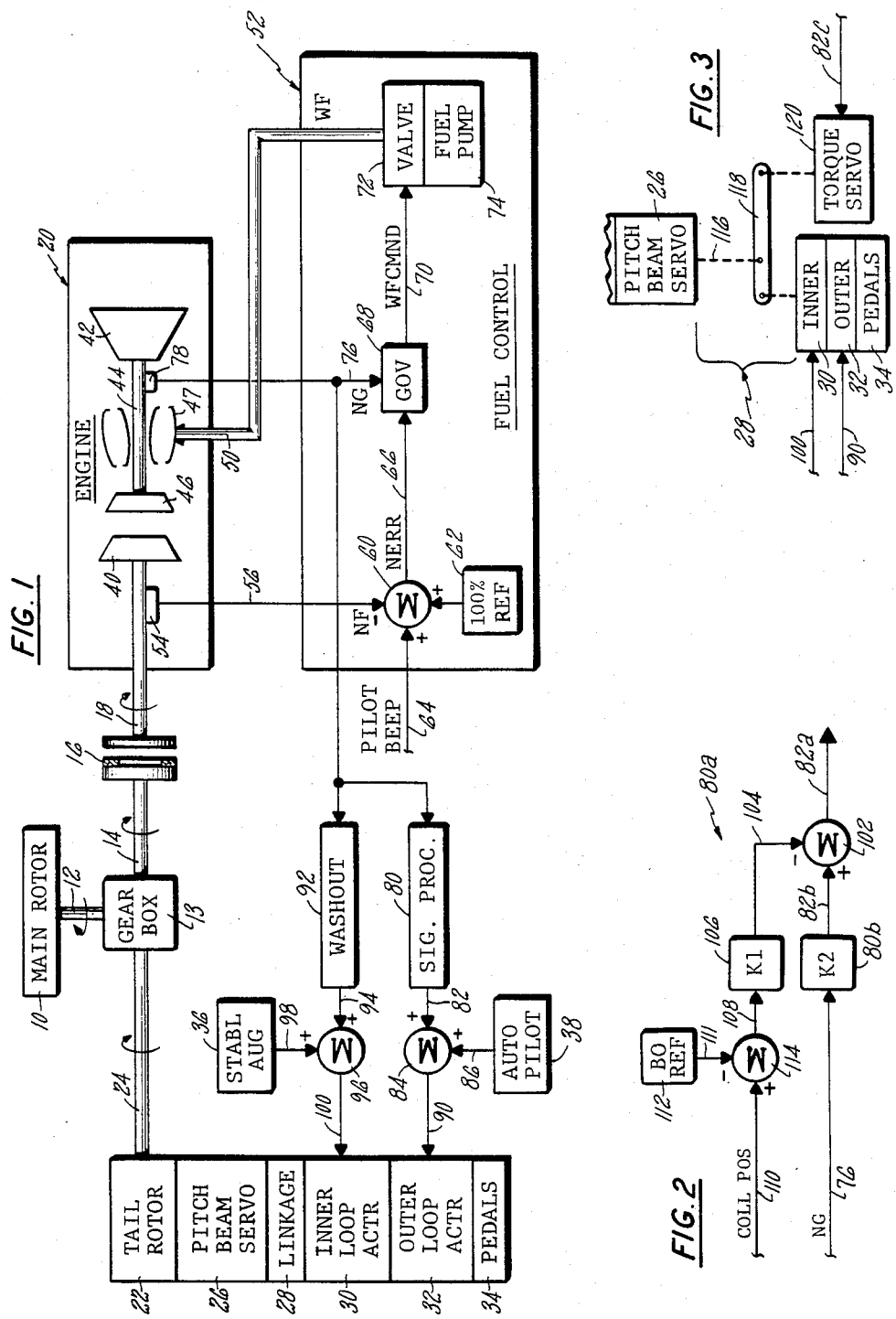

HELICOPTER ENGINE TORQUE COMPENSATOR

The Government has rights in this invention pursuant to Contract No. DAAK51-80-C-0038 awarded by the Department of the Army.

DESCRIPTION

1. Technical Field

This invention relates to helicopters, and more particularly to improved means for stabilizing the helicopter airframe against rotation as a consequence of reaction to torque coupled to the main rotor.

2. Background Art

As is known, one typical type of helicopter has a main rotor which provides lift and forward thrust in response to torque provided thereto through rotary power means, including an engine, in a manner determined by the pitch angle of the rotor blades. In order to stabilize the airframe against rotation as a consequence of the torque applied by the engine to the main rotor, this type of helicopter has a tail rotor, the rotary speed of which is a fixed, geared function of the speed of the main rotor. The angle of the tail rotor blades, in addition to being adjustable to provide maneuvers in yaw, is adjusted to provide thrust to apply torque to the airframe, about a yaw axis, which will compensate for the torque applied by the engine to the main rotor, so that the airframe will be rotationally stable (rather than tending to rotate under the rotor). Control over the amount of compensating thrust provided by the tail rotor is achieved by varying the tail rotor blade pitch angle as a function of the amount of collective pitch angle of the main rotor blades. Thus, the tail rotor blade angle pitch beam is provided with a command component which bears a fixed ratio to the collective pitch command to the main rotor, referred to as collective/tail pitch mixing.

The problem with proportional blade pitch mixing of the type currently used in helicopters is that it is incapable of providing a correct amount of torque compensation for various dynamic or steady operating conditions of the aircraft. For instance, with forward speed increasing from hovering flight, the main rotor collective pitch required (without any increase in altitude) initially decreases to a minimum (typically at around 60 to 80 knots) and then increases rapidly as maximum forward speed is approached. The required main rotor torque follows a similar profile, but, because of the non-linear relationship between rotor thrust and rotor torque, the rotor torque is not proportional to collective pitch. Thus, main rotor torque per unit collective pitch is not constant. In addition, because of changing aerodynamic wake patterns at the tail of the aircraft, the approximate linearity of tail rotor thrust to tail rotor collective pitch may be upset. Additional variability in the desired tail rotor blade pitch angle compared with main rotor collective pitch is introduced with variations in helicopter weight, center of gravity, climb speed, altitude and air temperature. Thus, the proportional collective/tail rotor mixing is at best a compromise which must be compensated, either by the pilot (by means of the yaw pedals) or by the heading hold system, even during steady flight conditions. Under dynamic conditions, such as maneuvering transients, the proportion of collective pitch may bear no relation at all to the torque being imparted by the engine to the drive train (and thus being reacted on the airframe). An obvious case exists during autorotation (the rotor is declutched from the drive train) when collective pitch stick manipulation will cause direct input of tail rotor blade pitch angle through the mixing, causing the generation of unwanted yaw moments on the airframe, which must be neutralized by the pilot (or heading hold). Another case is when resuming powered flight following an autorotation descent. During the autorotation descent, the engine is at idle but the rotor speed has increased to the level necessary to maintain the desired rate of descent. In order to arrest the descent, a large positive collective pitch input is required. The large collective pitch input, through the collective/tail mixing, also causes a corresponding yaw moment to be imparted by the tail rotor. Initially, as long as the rotor speed exceeds the engine speed, the engine is still approximately at idle and there is no airframe torque reaction because the rotor is still disengaged from the engine. This erroneous torque compensation, caused by the fixed, collective/tail coupling, must be compensated for by the pilot (or heading hold system). As soon as the rotor slows sufficiently so that its speed is equal to or below that of the engine, the clutch reengages, initially causing a drop in engine speed due to the torque loading thereof; the engine control, in attempting to regain the reference engine speed, spools up at a high rate and provides a torque overshoot. At this stage of the transient, there is inadequate torque compensation so that the pilot must reverse his pedal input. Many of these transients are sufficiently fast that a heading hold system cannot react quickly enough to compensate for them, thus requiring excessive pilot workload.

A more profound case of erroneous compensation is experienced during high-speed maneuvers with main rotor collective pitch fixed, which are executed by means of the cyclic pitch stick. In such cases, the engine torque requirements may vary drastically without any change in collective pitch input. Thus no compensation is provided when some is needed. One such case is the entry into a quick turn, in which airspeed kinetic energy is transferred into rotor torque to maintain or increase rotor speed; an autorotative state is reached and the clutch is disengaged, so the engine goes essentially to idle and maintains the reference speed while providing no torque to the rotor, and thus no torque reaction on the airframe. This change in torque states occurs with no change in input to tail rotor collective pitch (because there is no change in main rotor collective pitch). In this case, the pilot must compensate with his pedals for lack of input by the fixed, collective/tail mixing system. The exit from the turn is executed with combination of collective pitch and cyclic pitch. The exit from a quick turn will have torque reaction compensation problems similar to those described hereinbefore with respect to recovery from an autorotation descent. These examples illustrate that under both steady and maneuvering flight conditions, main rotor collective pitch is an inadequate indicator of the level of engine torque reaction on the airframe which must be compensated by the tail rotor.

From the foregoing, it can be seen that the compromise torque compensation provided by proportional collective/tail mixing is basically never the exact required compensation, and therefore must always be corrected by pilot manipulation of the pedals, except, of course, to the extent provided by a heading hold system, when engaged.

All of the aforementioned problems are aggravated by the extent to which the engine is not directly responsive to the current torque loading of the aircraft. For instance, if the engine fuel control system has a very large lag characteristic, the aforementioned problems will be still worse. Of course, employing a heavy lead response in the fuel control to increase collective pitch commands will tend to mitigate the aforementioned problems. But in any case, the compromise torque compensation provided by fixed, collective/tail mixing is inadequate.

DISCLOSURE OF INVENTION

Objects of the invention include providing helicopter engine torque compensation which is essentially correct under substantially all operating conditions.

According to the present invention, the blade pitch angle of a helicopter tail rotor is adjusted, in order to provide engine torque compensation, in response to a parameter taken from the main rotor driving means which is a substantially correct indication of torque reaction applied to the airframe under essentially all flight conditions. In accordance with one aspect of the invention, the tail rotor blade pitch angle is controlled as a function of gas generator speed in a helicopter having a free turbine engine including a turbocompressor gas generator. According to another aspect of the present invention, the blade pitch angle of the helicopter tail rotor is controlled in relation to the amount of fuel supplied to the engine. According to still another aspect of the invention, the blade pitch angle of a helicopter tail rotor is controlled, to provide main rotor torque compensation, by fixed collective/tail mixing of the type known to the prior art with trimming in response to a torque-indicating parameter taken from the rotor driving means of the aircraft. In accordance still further with the present invention, the torque-indicating parameter utilized either to completely control or to trim the collective/tail mixing control of torque compensating tail rotor blade pitch angle may be chosen from a wide variety of factors in the rotor driving means, such as fuel supply, gas generator speed, free turbine or other output shaft torque or acceleration.

The present invention may be implemented in a variety of ways in conjunction with a variety of rotor driving means. For instance, when analog signals are available indicative of torque such as fuel rate, engine shaft speed, output shaft torque or acceleration, or the like, an analog system may be used. Whenever a digital fuel control is involved, the invention may be practiced (in response to commensurate signals) utilizing dedicated digital components, or it may be implemented in software applied to a digital fuel control which includes a microprocessor or the like. Similarly, digital implementation of the invention may be achieved by utilizing software within an automatic flight control system computer, when one is available on the aircraft.

The invention may be practiced by applying the torque compensating tail rotor blade pitch angle commands to a yaw outer loop actuator, when one is available on the aircraft, or to an additional actuator utilized to provide motion to the linkages currently used in an aircraft for fixed, collective/tail mixing (with or without inputs through a stability, inner loop actuator). All of the ways in which the present invention may be practiced and utilized are well within the skill of the art and the capability of existing technology, in the light of the teachings which follow hereinafter.

The foregoing and other objects, features and advantages of the present invention will become more apparent in the light of the following detailed description of exemplary embodiments thereof, as illustrated in the accompanying drawings.

BRIEF DESCRIPTION OF THE DRAWINGS

FIG. 1 is a simplified schematic illustration of a helicopter drive system incorporating one embodiment of the present invention;

FIG. 2 is a simplified schematic illustration of a trimmer embodiment of the present invention;

FIG. 3 is a simplified schematic illustration of a separate servo embodiment of the present invention.

BEST MODE FOR CARRYING OUT THE INVENTION

Figure 4:
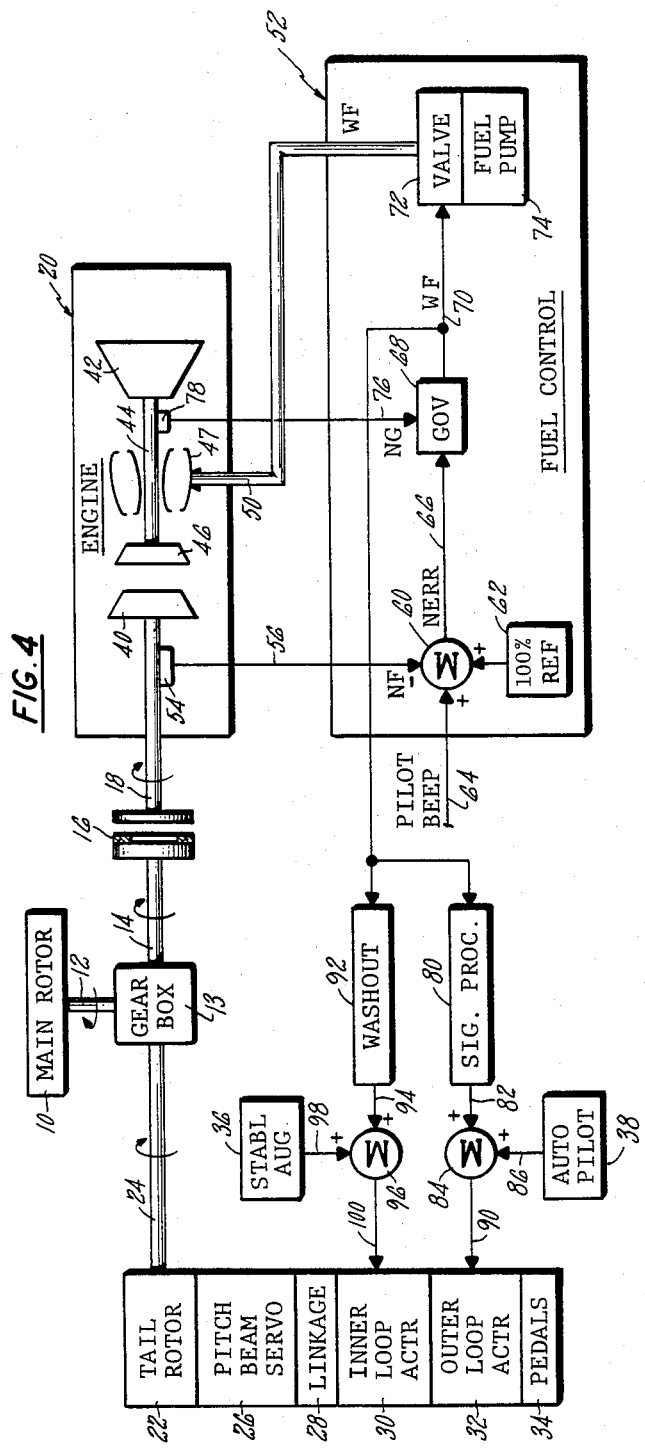
FIG. 4 is a simplified schematic illustration of a helicopter drive system incorporating an alternate embodiment of the present invention.

Referring now to FIG. 1, a main rotor 10 is connected through a shaft 12 to a gear box 13 which is driven by a shaft 14 through an overrunning clutch 16, which engages an output shaft 18 of an engine 20 when the engine speed equals or exceeds the rotor speed. The gear box 13 also drives a tail rotor 22 through a shaft 24 so that the main rotor 10 and the tail rotor 22 are always driven at speeds bearing a fixed relationship to each other, such as the tail rotor rotating about five times faster than the main rotor. The pitch angle of the blades on the tail rotor 22 is adjusted by a pitch beam servo 26 in response to inputs thereto provided by linkage 28 which connects the tail-mounted pitch beam servo 26 to controls therefor in the forward part of the airframe. These may include a yaw inner loop actuator 30, a yaw outer loop actuator 32 and pilot pedals 34, all of which may be of any known type. The yaw inner loop actuator 30 is controlled essentially by signals from a stability augmentation system 36, and the yaw outer loop actuator 32 is controlled essentially by signals from an autopilot system 38. Although not shown, the inner loop actuator 30 is usually also responsive to lead functions provided thereto from the autopilot system 38. The inner and outer yaw controls 30–38 may be as described more fully in a commonly owned copending U.S. patent application Ser. No. 249,273, filed on Mar. 30, 1981 by Fischer et al, and entitled AIRCRAFT COORDINATED TURN WITH LAGGED ROLL RATE, which is incorporated herein by reference.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control 52. The fuel control 52 typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. The other inputs to the summing junction 60 comprise the reference speed, which typically is a reference value indicative of 100% rated speed derived from a source 62 together with any pilot-desired variant therein as determined by a signal from the pilot's engine speed beeper on a line 64. The output of the summing junction 60 is a speed error signal on a line 66 which is applied to the governor portion 68 of the fuel control, the output of which is a commanded fuel rate (WFCMND) on a line 70. This is applied to the metering valve 72 so as to cause the correct amount of fuel from a fuel pump 74 to be applied to the fuel inlet lines 50, all in the well known way. Within the governor 68, a signal indicative of gas generator speed (NG) on a line 76 may be taken from a tachometer 78 responsive to the gas generator spool including the compressor 42, the shaft 44 and the turbine 46.

A preferred mode for implementing the present invention is controlling the tail rotor blade pitch angle for torque compensation in response to the gas generator speed NG on the line 76. This signal is applied to a signal processor 80, which in the simplest embodiment may simply be a suitable gain, the output of which on a line 82 is applied to a summing junction 84 for addition with the autopilot command signal on a line 86 from the autopilot system 38, so as to provide a signal on a line 90 which incorporates both torque compensation and autopilot signals. If desired, for faster response, the gas turbine speed signal on the line 76 can also be provided through suitable filtering circuits such as a washout circuit 92 to provide a signal on a line 94 for application to a summing junction 96 along with stability augmentation system 36, so as to provide a signal on a line 100, indicative of both stability augmentation and fast response to torque compensation requirements, to the yaw inner loop actuator 30.

The embodiment shown in FIG. 1 utilizes gas generator speed as the engine function or parameter related to torque because this provides a somewhat leading indication of the required torque compensation, as compared with utilizing the free turbine speed signal on the line 56. If desired, however, additional lead may be achieved by utilizing the fuel rate command signal on the line 70 rather than the gas generator speed signal on the line 76 as shown in FIG. 4. Or, the turbine speed signal on line 56 could be differentiated (acceleration) and used in place of the signal on line 76. In a system which does not employ a free turbine gas engine 20 of the type described herein, either engine output shaft torque or speed, or engine fuel rate signals may be utilized, where available. None of this is essential to the present invention, so long as a rotor driving system signal indicative of torque is utilized, the invention will provide significant advantages as described hereinbefore.

The system of FIG. 1 is illustrated as being one in which the entire rotor torque compensation blade angle command to the tail rotor pitch beam is provided in response to a signal from the rotor driving system. The present invention may also be employed as a trimmer for systems of the type currently employed wherein the tail rotor blade pitch angle is adjusted in a fixed manner with respect to collective pitch. In such a case, the fixed, compromise value of torque compensation is provided by the fixed, collective/tail mixing of the type well known in the art, and only the difference between that and a desired torque compensation blade angle is provided by the present invention. In such a case, the signal processor 80 may take the form of the signal processor 80a illustrated in FIG. 2. Therein, the signal on a line 82a is provided by a summing junction 102 in which the desired torque is indicated by a signal on a line 82b, such as provided by a gain K2 in an amplifier 80b equivalent to the signal processing circuit 80 of FIG. 1. The desired torque has subtracted therefrom the nominal blade angle being commanded by the fixed, collective/tail mixing as indicated by a signal on a line 104. This signal is provided in response to an amplifier 106 having a gain K1, the input to which on a line 108 is indicative of the fixed, collective/tail mixing which is provided in current, conventional helicopters.

The collective/tail mixing of prior art helicopters may be expressed as $$BT1 = K1(BM - BO), \quad (1)$$

wherein BT1 is the blade angle command provided by the collective/tail mixing, K1 is the ratio of collective to tail blade angle mixing, BM is the main rotor blade angle being commanded by the collective command and BO is the collective angle command below which no tail rotor coupling is provided.

In contrast, the embodiment of the invention described with respect to FIG. 1 provides the tail rotor blade angle command BT2 as a product of some gain K2 and gas generator speed NG, as in expression (2).

$$BT2 = K2(NG) \quad (2)$$

Or, if the alternative embodiment is used, a blade angle command BT3 may be provided as the product of a suitable gain K3 and the fuel rate indication such as the WFCMND signal on the line 70, as in expression (3).

$$BT3 = K3(WFCMND) \quad (3)$$

For the embodiment of FIG. 2, wherein only trimming is required, the blade angle command BT4 on the line 82a is provided as a combination of the product of the gain K2 with the gas generator speed NG but subtracting therefrom that part of blade angle which will be automatically provided by the fixed, collective/tail mixing of the prior art, as in expression (4).

$$BT4 = K2(NG) - K1(BM - BO) \quad (4)$$

Thus, in FIG. 2, the signal on the line 108 represents the difference between (a) the main rotor blade angle as indicated by a signal indicative of collective stick position on a line 110 and (b) a signal on a line 111 indicative of the zero tail rotor torque compensation value of main rotor collective pitch, as provided by a reference source 112, which difference is accomplished in a summing junction 114. Of course, the trimming embodiment of the invention may be applied without regard to which main rotor drive system torque indicating signal (shaft torque or speed, fuel, and the like) is chosen.

The embodiment of FIG. 1 utilizes the yaw outer loop actuator as an input for torque compensation. Instead, the torque compensation may be applied through the linkage in the same fashion as it is when fixed, collective/tail mixing is employed. This is illustrated in FIG. 3 in which the linkage 28 is seen to include a cable 116 which is moved differentially in response to a mixer 118 that is connected to the inner and outer loop and the pedals 30–34 on one side, and to a torque servo 120 on the other side. In conventional helicopters known to the art, the mixer 118 is responsive to a linkage taken from the collective pitch control to provide fixed, collective/tail mixing. The use of a torque servo 120 is required only to convert from a torque compensating tail rotor blade pitch angle command on a line 82c (which may be any of those described hereinbefore) to a mechanical input to the pitch beam servo 26.

By proper adjustment of gain, suitable signal filtering and the like (including sohpisticated shaping of the drive signal, as in the signal processor 80, as desired), the present invention can cause the engine torque compensation provided by the tail rotor to be essentially perfect in any case where the engine is coupled to the rotor as well as when the rotor is decoupled. However, of course, there will be certain transient lags and the like due to excessive maneuvering and lag variations in engine speed as a consequence thereof. However, these will normally be so slight and of short duration to be insignificant to the pilot. On the other hand, whenever the helicopter is in autorotation, with the main rotor declutched from the engine, the tail rotor pitch beam will be provided with very little torque compensation blade angle input command, compensation for the torque applied by the rotor to any auxiliary system on the rotor side of the clutch must then be provided either through the pilot pedals or through the autopilot and stability system; but this is minimal (of the same order as yaw moments induced by turbulence and the like).

As described briefly hereinbefore, the invention may be readily implemented in an aircraft having a digital fuel control system implemented in part by a microprocessor simply by providing the necessary signal processing by programming to accomplish the desired result, for application either to the existing yaw actuators, or to an additional torque servo 120 of the type illustrated in FIG. 3, or both. The invention may also be practiced in systems having digital fuel controls by utilizing software in the automatic flight control system computer to accomplish the desired signal processing. In other cases, either analog or dedicated digital circuitry may be provided as desired to accomplish the effects of the present invention. None of this is really germane, it suffices that the invention may be practiced by controlling the tail rotor blade pitch angle for engine torque compensation in response to a signal which is indicative of torque taken from the main rotor drive system.

Thus, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. An engine torque compensation for a helicopter including a free turbine engine (20) for driving the main (10) and tail (22) rotors, a closed loop fuel control (52) for maintaining the rotor speed constant by providing a fuel rate signal (WF) in response to an engine output shaft speed signal (NF) and a gas generator speed signal (NG), and a heading hold system for varying the tail rotor pitch to maintain yaw, characterized in that the heading hold system is responsive to the gas generator speed signal (NG) for providing engine torque compensation.

2. An engine torque compensation system for a helicopter including a free turbine engine (20) for driving the main (10) and tail (22) rotors, a closed loop fuel control (52) for maintaining the rotor speed constant by providing a fuel rate signal (WF) in response to an engine output shaft speed signal (NF) and a gas generator speed signal (NG), and a heading hold system for varying the tail rotor pitch to maintain yaw, characterized in that the heading hold system is responsive to the fuel rate signal (WF) for providing engine torque compensation.

* * * * *